United States Patent Office 3,647,629
Patented Mar. 7, 1972

3,647,629
PROCESS FOR DEMETHOXYLATION BY MICRO-ORGANISMS
Atsushi Yamamoto, Machida-shi, Tairiku Omori, Kitakyushu-shi, and Hiroshi Yasui, Machida-shi, Japan, assignors to Kyowa Hakko Kogyo Co., Ltd., Tokyo, Japan
No Drawing. Continuation of application Ser. No. 617,057, Feb. 20, 1967. This application June 14, 1968, Ser. No. 736,980
Int. Cl. C12d *13/00*
U.S. Cl. 195—30                    13 Claims

ABSTRACT OF THE DISCLOSURE

The present disclosure relates to a process for the demethoxylation of certain organic compounds, particularly benzoic acid and benzaldehyde derivatives having the formula

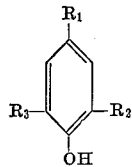

wherein $R_1$ is CHO or COOH, $R_2$ is $OCH_3$ and $R_3$ is H, OH or $OCH_3$. This is accomplished by culturing a micro-organism capable of splitting off a methoxyl group, for example, those of the genera Saccharomyces or Torula, under aerobic conditions in an aqueous nutrient medium containing the compound to be demethoxylated.

CROSS-REFERENCE TO THE RELATED APPLICATION

This application is a continuation of copending application Ser. No. 617,057, filed on Feb. 20, 1967.

The present invention relates to a process for the demethoxylation of certain organic compounds by means of micro-organisms.

The present inventors have studied the fragrance components of refined sake, especially for the purpose of determining the constitution and the mechanism of the production thereof. The presence of vanillin has been found as a fragrant element therein. As a result, it was assumed that the vanillin might be produced by the oxidation of ferulic acid, the presence of which in refined sake has also been discovered by the present inventors.

In order to support this assumption, the fermentation of vanillin with a yeast belonging to the genus Saccharomyces was carried out. However, contrary to expectations, the vanillin added to the culture medium was easily mutated and destroyed. As a result of further research with the use of paper chromatography on the fermentation products, it has been found that small amounts of vanillyl alcohol as well as remarkably large amounts of vanillic acid are formed in the culture medium, together with the complete disappearance of vanillin. Furthermore, as the result of the identification of the aerobiological fermentation products obtained from an aerobic or shaking culture medium, the present inventors have found that a considerable amount of p-hydroxybenzoic acid and a small amount of p-hydroxybenzaldehyde as well as a small amount of vanillyl alcohol and vanillic acid, with the complete disappearance of vanillin, are formed. These facts show that there is a quite novel fermentation mechanism in that the Saccharomyces yeast employed, for example, *Saccharomyces sake* ATCC 20018, has the ability to change the vanillin and to break away the methoxyl group at the 3-position of vanillin under aerobic conditions. This mechanism has never been described in the prior art.

Accordingly, the present inventors have studied, on the one hand, whether or not other yeasts belonging to the genus Saccharomyces as well as other micro-organisms not belonging to this genus have such a fermenting capability and, on the other hand, the fermentation products obtained from an aerobic culture by paper chromatography. In particular, the compounds represented by the general formula

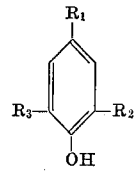

wherein $R_1$ is CHO or COOH, $R_2$ is $OCH_3$ and $R_3$ is H, OH or $OCH_3$ have been studied.

Accordingly, one of the objects of the present invention is to provide a process for demethoxylation by micro-organisms.

Another object of the present invention is to provide a process for the demethoxylation of benzoic acid or benzaldehyde derivatives containing a methoxyl group at the 3-position or at the 3- and 5-positions thereof which may be carried out efficaciously and simply.

A further object of the invention is to provide a process for producing the product formed by the particular demethoxylation by means of microorganisms which gives this product in good yield.

These and other objects and advantages of the present invention will become apparent to those skilled in the art from a consideration of the following specification and claims.

In accordance with the present invention, it has been found that benzoic acid or benzaldehyde derivatives containing a methoxyl group at the 3-position or at the 3- and 5-positions may be demethoxylated by culturing microorganisms therewith under aerobic conditions in a suitable culture medium. In this way, the methoxyl group of compounds represented by the general formula

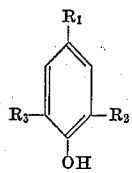

wherein $R_1$ is CHO or COOH, $R_2$ is $OCH_3$ and $R_3$ is H, OH or $OCH_3$, is removed.

The results of the investigations on these compounds discussed above are shown in Table 1.

TABLE 1

| Compound | Microorganism used | Fermentation product |
|---|---|---|
| 4-hydroxy-3-methoxybenzaldehyde (vanillin): OH, OCH$_3$, CHO | 1. *Saccharomyces sake* ATCC 20018. <br> 2. *Saccharomyces sp.* ATCC 20017. <br> 3. *Torula utilis* ATCC 15239. <br> 4. *Saccharomyces cerevisiae* ATCC 15248. | (1) p-Hydroxybenzoic acid. <br> (2) p-Hydroxybenzaldehyde. <br> (3) p-Hydroxybenzyl alcohol. <br> (4) Vanillyl alcohol. <br> (5) Vanillic acid. |
| 4-hydroxy-3-methoxybenzoic acid: OH, OCH$_3$, COOH | 1. *Saccharomyces sake.* | (1) p-Hydroxybenzoic acid. <br> (2) Undetermined substance. |
| 4-hydroxy-3,5-dimethoxybenzaldehyde: OH, H$_3$CO, OCH$_3$, CHO | 1. *Saccharomyces sake* ATCC 20018. <br> 2. *Torula utilis* ATCC 15239. | (1) p-Hydroxybenzoic acid. <br> (2) p-Hydroxybenzaldehyde. <br> (3) 3,5-dimethoxy-4-hydroxy-benzyl alcohol. <br> (4) 3,5-dimethoxy-4-hydroxy-benzoic acid. |
| 3,5-dimethoxy (no 4-OH): H, H$_3$CO, OCH$_3$, COOH | 1. *Saccharomyces cerevisiae* ATCC 15248 (surface fermentation). | (1) p-Hydroxybenzoic acid. <br> (2) Undetermined substance. |
| 3,4-dihydroxy-5-methoxybenzaldehyde: OH, HO, OCH$_3$, CHO | 1. *Saccharomyces sake* ATCC 20018. <br> 2. *Torula utilis* ATCC 15239. | (1) 3,4-dihydroxybenzoic acid. <br> (2) 3,4-dihydroxybenzaldehyde. <br> (3) 3,4-dihydroxybenzyl alcohol. <br> (4) 3-methoxy-4,5-dihydroxybenzyl alcohol. <br> (5) 3-methoxy-4,5-dihydroxybenzoic acid. |
| 3,4-dihydroxy-5-methoxybenzoic acid: OH, HO, OCH$_3$, COOH | 1. *Saccharomyces sake* ATCC 20018. | (1) 3,4-dihydroxybenzoic acid. <br> (2) Undetermined substance. |

From these results, it can be seen that the aerobic culturing of a microorganism in a suitable culture medium containing the compounds represented by the above general formula demethoxylates the compound at the 3-position or at the 3- and 5-positions. The resutlant product is then accumulated in the culture medium.

The following examples are given merely as illustrative of the present invention and are not to be considered as limiting. Unless otherwise noted, the percentages therein are by weight.

Example 1

To a culture medium consisting of 100 g. of glucose, 2.5 g. of L-asparagine, 1.0 g. of dihydrogen potassium phosphate, 3.0 g. of magnesium sulfate hetpahydrate and 1 liter of tap water is added 0.1 g. of vanillin. The medium is adjusted to a pH of between 4 and 5. Then, 100 ml. of a spore-containing solution of *Saccharomyces sake* ATCC 20018, which has been cultured separately in the same culture medium as described above but in the absence of vanillin, is added to the medium.

The resultant mixture is cultured with aerobic shaking at a temperature between 28° and 30° C. for five days; it is then centrifuged. The upper layer clear solution thus obtained is mixed with 1 gram of potassium hydroxide and concentrated under a reduced pressure to about 200 ml. The residue is acidified with sulfuric acid and extracted with ether continuously for two days in order to collect the fermentation products. Most of the solvent is distilled off, and the concentrated ether solution is shaken with a small amount of a saturated sodium bicarbonate solution in order to separate it into acidic and neutral components. The acidic phase dissolved in the saturated sodium bicarbonate solution is made more slightly acidic with sulfuric acid, and then is extracted with ether. Approximately 0.08 gram of extract is obtained.

The extracted products are inspected by means of paper chromatography. Specifically, the extracted products are placed across the breath of Toyo filter paper No. 50, and an ascending development of the chromatogram is repeated with 1.5 N ammonia-saturated n-butanol three times. Two separate absorption bands, an upper and a lower, can be distinguished by subjecting them to ultraviolet rays of 2536 A. From these two bands, two different types of acidic products, respectively, can be isolated.

About 0.06 gram of crude product obtained from the upper band is purified by sublimating it under a reduced pressure. It is then subjected to elemental analysis, melting point measurements, mixed compound examinations and measurements of the ultraviolet and infrared spectra thereof. The results are as follows. The melting point is 211° C. in a mixed examination with a pure sample of p-hydroxybenzoic acid, no depression of the melting point is observed. The values obtained from the elemental analysis and the infrared analysis are in good accord with each other. Moreover, the infrared and ultraviolet spectra both coincide substantially perfectly, even in detailed portions thereof. Thus, one of the isolated products is identified as being p-hydroxybenzoic acid. The other isolated product is proved as being vanillic acid.

The ether extract left after removing the acidic components with the saturated sodium bicarbonate solution is also inspected by means of paper chromatography, using Toyo filter paper No. 50. After an ascending development with 1.5 N ammonia-saturated n-butanol for one night, p-nitroaniline diazonium chloride and 2,4-dinitrophenylhydrazine are sprayed thereon. As a result, the formation of p-hydroxybenzyl alcohol, p-hydroxybenzaldehyde and vanillyl alcohol is proved. There is no trace of vanillin left.

Example 2

One kg. of glucose, 25 g. of L-asparagine, 10 g. of dihydrogen potassium phosphate, 30 g. of magnesium sulfate heptahydrate, 1 g. of vanillin and 10 liters of tap water are mixed and adjusted to a pH of 4 to 5. This culture medium is placed in a jar fermentor having a volume of 20 liters. Added thereto is 1 liter of the spore-containing solution of *Saccharomyces sake* ATCC 20018, which has been purely cultured separately in the medium as described above but in the absence of vanillin.

The resultant mixture is cultured with the passing of sterilized air therethrough at the rate of 10 liters per minute for five days. The obtained fermented solution is subjected to the separating operation described in Example 1, and 0.55 gram of p-hydroxybenzoic acid crystals is obtained.

Example 3

100 g. of glucose, 2.5 g. of L-asparagine, 1.0 g. of dihydrogen potassium phosphate, 3.0 g. of magnesium sulfate heptahydrate, 0.1 g. of vanillin and 1 liter of tap water are mixed; the pH of this solution is adjusted to from 4 to 5. This culture medium is then added to 100 ml. of a spore-containing solution of *Torula utilis* ATCC 15239, which has been purely cultured in the same medium as described above but in the absence of vanillin. The resultant mixture is cultured with aerobic shaking at a temperature between 28° C. and 30° C. for five days.

After treating the resultant fermentation solution in the same manner as described in Example 1, 0.04 g. of p-hydroxybenzoic acid is obtained.

The culturing involved in the process of the present invention is carried out in a conventional manner known in the art. Thus, it is conducted under aerobic conditions, such as aerobic shaking of the culture or with stirring of a submerged culture at a temperature of about 28° to 35° C. and at a pH of about 3.5 to 6.0. Either a synthetic culture medium or a natural nutrient medium is suitable as long as it contains the essential nutrients for the growth of the particular strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as glycerol, organic acids, etc. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, peptone, fish meal, casein hydrolysates, fish solubles, etc. may be employed. The nitrogen source may also be a single substance or a combination of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. The compound to be demethoxylated by the process of the present invention is advantageously added to the culture medium in an amount of from 0.0001 to 1% by weight.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for the demethoxylation of benzoic acid and benzaldehyde derivatives by microorganisms which comprises culturing a yeast capable of splitting off a methoxyl group bonded to a carbon atom under aerobic conditions in an aqueous nutrient medium containing a compound selected from the group consisting of benzoic acid and benzaldehyde derivatives having the general formula:

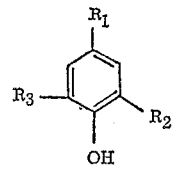

wherein $R_1$ is CHO or COOH, $R_2$ is $OCH_3$ and $R_3$ is H, OH or $OCH_3$, whereby the methoxyl group or groups are removed therefrom.

2. The process of claim 1, wherein said yeast belongs to the genus Saccharomyces.

3. The process of claim 1, wherein said yeast belongs to the genus Torula.

4. The process of claim 1, wherein said compound is vanillin.

5. The process of claim 3, wherein said yeast is *Saccharomyces sake*.

6. The process of claim 2, wherein said yeast is *Saccharomyces cerevisiae*.

7. The process of claim 3, wherein said yeast is *Torula utilis*.

8. The process of claim 2 wherein said culturing is carried out at a temperature of from about 28° to 30° C. and a pH of about 4 to 5.

9. The process of claim 3, wherein said culturing is carried out at a temperature of from about 28° to 30° C. and a pH of about 4 to 5.

10. The process of claim 8, wherein said yeast is *Saccharomyces sake* ATCC 20018.

11. The process of claim 8, wherein said yeast is Saccharomyces sp. ATCC 20017.

12. The process of claim 8, wherein said yeast is *Saccharomyces cerevisiae* ATCC 15248.

13. The process of claim 9, wherein said yeast is *Torula utilis* ATCC 15239.

References Cited

Chemical Abstracts 63, 6040g (1965) abstract of Sci. Sinica (Peking) 14 (6) 891 (1965) (Eng.).

LIONEL M. SHAPIRO, Primary Examiner

U.S. Cl. X.R.

195—28 R

UNITED STATES PATENT OFFICE
CERTIFICATE OF CORRECTION

Patent No. 3,647,629    Dated  March 7, 1972

Inventor(s) Atsushi Yamamoto, Tairiku Omori and Hiroshi Yasui

It is certified that error appears in the above-identified patent and that said Letters Patent are hereby corrected as shown below:

In Column 1,

After line 10, insert

-- Claims priority, application Japan, Feb. 21, 1966, 10081/66 --

Signed and sealed this 25th day of July 1972.

(SEAL)
Attest:

EDWARD M. FLETCHER, JR.       ROBERT GOTTSCHALK
Attesting Officer      Commissioner of Patents